(12) United States Patent
Oyobe et al.

(10) Patent No.: US 8,344,699 B2
(45) Date of Patent: Jan. 1, 2013

(54) POWER SUPPLY, SYSTEM HAVING A PLURALITY OF POWER STORAGE UNITS, VEHICLE USING THE SAME, AND ITS CONTROL METHOD

(75) Inventors: Hichirosai Oyobe, Toyota (JP); Shinji Ichikawa, Toyota (JP); Eiji Sato, Nishikamo-gun (JP)

(73) Assignee: Toyota Jidosha Kabushiki Kaisa, Toyota (JP)

( * ) Notice: Subject to any disclaimer, the term of this patent is extended or adjusted under 35 U.S.C. 154(b) by 509 days.

(21) Appl. No.: 12/311,823

(22) PCT Filed: Dec. 11, 2007

(86) PCT No.: PCT/JP2007/074196
§ 371 (c)(1),
(2), (4) Date: Apr. 15, 2009

(87) PCT Pub. No.: WO2008/072762
PCT Pub. Date: Jun. 19, 2008

(65) Prior Publication Data
US 2010/0207587 A1    Aug. 19, 2010

(30) Foreign Application Priority Data
Dec. 14, 2006  (JP) .................................. 2006-336525

(51) Int. Cl.
*H02J 7/04* (2006.01)
*H02J 7/16* (2006.01)
(52) U.S. Cl. ........................................ 320/152; 320/144
(58) Field of Classification Search .................... 320/152
See application file for complete search history.

(56) References Cited

U.S. PATENT DOCUMENTS

| 5,103,923 | A | 4/1992 | Johnston et al. |
| 5,373,195 | A | 12/1994 | De Doncker et al. |
| 6,163,135 | A | 12/2000 | Nakayama et al. |
| 6,608,396 | B2 | 8/2003 | Downer et al. |
| 6,930,460 | B2 | 8/2005 | Ishikawa et al. |
| 7,115,332 | B2 | 10/2006 | Tanjou |
| 2001/0011884 | A1* | 8/2001 | Sakakibara .................. 320/150 |
| 2002/0109406 | A1* | 8/2002 | Aberle et al. ................ 307/10.1 |
| 2003/0107352 | A1 | 6/2003 | Downer et al. |

(Continued)

FOREIGN PATENT DOCUMENTS
EP          1 167 110 A2    1/2002
(Continued)

OTHER PUBLICATIONS

U.S. Appl. No. 12/227,846, filed Dec. 1, 2008 in the name of Ichikawa et al.

(Continued)

*Primary Examiner* — Arun Williams
(74) *Attorney, Agent, or Firm* — Oliff & Berridge, PLC

(57) ABSTRACT

When the relation of battery temperature Tb1>battery temperature Tb2 is satisfied, a temperature increase request for a power storage unit becomes relatively large. Therefore, a target power value $P_2^*$ for the power storage unit is determined with priority. The target power value $P_2^*$ is calculated by multiplying the required power value Ps* by a distribution ratio $Pr_2$ ($0.5 \leq$ distribution ratio $Pr_2 \leq 1.0$) determined in accordance with temperature deviation between battery temperature Tb1 and battery temperature Tb2. The target power value $P_1^*$ is determined by subtracting the target power value $P_2^*$ from the required power value Ps*.

10 Claims, 9 Drawing Sheets

U.S. PATENT DOCUMENTS

| | | |
|---|---|---|
| 2003/0186116 A1 | 10/2003 | Tanjou |
| 2007/0018608 A1* | 1/2007 | Okumura .................. 320/104 |

FOREIGN PATENT DOCUMENTS

| | | |
|---|---|---|
| JP | A-6-276609 | 9/1994 |
| JP | A-06-284788 | 10/1994 |
| JP | A-11-162524 | 6/1999 |
| JP | A-2000-040532 | 2/2000 |
| JP | A-2000-092614 | 3/2000 |
| JP | 2000-306613 | 11/2000 |
| JP | A-2001-185228 | 7/2001 |
| JP | 2003-127807 | 5/2003 |
| JP | 2003-129927 | 5/2003 |
| JP | A-2003-209969 | 7/2003 |
| JP | A-2003-282154 | 10/2003 |
| JP | A-2003-339103 | 11/2003 |
| JP | A-2004-147477 | 5/2004 |
| JP | A-2005-176430 | 6/2005 |
| JP | A-2006-307661 | 11/2006 |
| RU | 2 070 857 C1 | 12/1996 |
| RU | 2 234 430 C1 | 8/2004 |
| WO | WO 2005/105511 A1 | 11/2005 |

OTHER PUBLICATIONS

U.S. Appl. No. 12/310,564, filed on Feb. 27, 2009 in the name of Sawada et al.

Japanese Office Action issued in Japanese Patent Application No. 2006-336525, dated Aug. 31, 2010 (with translation).

Japanese Office Action issued in Japanese Patent Application No. 2006-336525, on Jan. 19, 2010, (with English translation).

Russian Office Action issued in Russian Patent Application No. 2009126749/09(037234), on Mar. 3, 2010, with English Translation.

* cited by examiner

POWER SUPPLY, SYSTEM HAVING A PLURALITY OF POWER STORAGE UNITS, VEHICLE USING THE SAME, AND ITS CONTROL METHOD

TECHNICAL FIELD

The present invention relates to a power supply system having a plurality of power storage units, a vehicle provided with the system, and to a method of controlling the same. Particularly, the present invention relates to a technique of managing electric power charged/discharged at each of the power storage units, taking into consideration temperature difference among the power storage units.

BACKGROUND ART

Recently, in consideration of environmental issues, vehicles using electric motors as driving sources, such as electric vehicles, hybrid vehicles and fuel cell vehicles are attracting attention. Such a vehicle is provided with a rechargeable power storage unit for supplying power to the electric motor and for converting kinetic energy to electric energy and storing the same at the time of regenerative braking.

In the vehicle having an electric motor as the driving source as described above, power supply of larger capacity is desirable in order to improve running performance such as acceleration characteristic and mileage per charge. As a method of increasing power supply capacity, provision of a plurality of power storage units has been proposed.

By way of example, U.S. Pat. No. 6,608,396 discloses an electrical motor power management system providing a desired high DC voltage level in a high-voltage vehicle traction system. The electrical motor power managements system includes: a plurality of power stages for providing DC power to at least one inverter, each stage including a battery and boost/buck DC-DC converter, and wired in parallel; and a controller controlling the plurality of power stages such that the batteries of the plurality of power stages are uniformly charged/discharged whereby the battery voltage to the at least one inverter is maintained by the plurality of power stages.

On the other hand, the power storage unit implemented, for example, by a chemical battery stores electric energy utilizing electro-chemical reaction and, therefore, its charge/discharge characteristic is much susceptible to the influence of temperature. Generally, the charge/discharge characteristic tends to lower at a lower temperature, while deterioration proceeds faster at a higher temperature. Therefore, it is necessary to control temperature of the power storage unit mounted on a vehicle such that it is kept within a prescribed temperature range. Therefore, a power storage unit mounted on a vehicle is often prepared as a package including a cooling fan.

When a plurality of power storage units are to be mounted on a vehicle, however, the package structure may lead to variation in cooling performance among the power storage units. As a result, even if the power storage units are made to have the same rated value and charge/discharge power with each other, temperature may still vary among the power storage units. Specifically, cooling of one electric storage unit may be relatively too much and the unit temperature may decrease, or cooling of one electric storage unit may be relatively insufficient and the unit temperature may increase.

The electrical motor power management system disclosed in U.S. Pat. No. 6,608,396 does not at all consider the temperature of batteries (power storage units) and, therefore, temperature variation among the plurality of power storage units cannot be avoided.

DISCLOSURE OF THE INVENTION

The present invention was made to solve the above-described problem and its object is to provide a power supply system allowing efficient temperature management of the power storage units as a whole by making uniform the temperature of power storage units while satisfying required power value from a load device, a vehicle provided with the system and a method of controlling the same.

According to an aspect, the present invention provides a power system having a plurality of power storage units, each being rechargeable. The power system includes: a power line electrically connecting a load device and the power system; a plurality of converter units provided between the plurality of power storage units and the power line, respectively, each being capable of controlling charging/discharging of the corresponding power storage unit; temperature obtaining means for obtaining temperature of each of the plurality of power storage units; target power value determining means for determining a target power value for each of the plurality of power storage units, by distributing required power value from the load device in accordance with temperatures of the plurality of power storage units obtained by the temperature obtaining means; and converter control means for controlling the plurality of converter units in accordance with the target power value determined by the target power value determining means.

According to the present invention, the target power value for each of the plurality of power storage units is determined as the required power value from the load device is distributed in accordance with the temperature of the plurality of power storage units. The plurality of converter units are controlled such that charge/discharge takes place in each of the plurality of power storage units in accordance with the corresponding target power value. Consequently, it follows that the target power value is a distributive share of the required power value. Therefore, when the system is viewed as a whole, the required power value from the load device is satisfied. At the same time, by appropriately distributing the target power value, unevenness of temperature among the power storage units can be eliminated, utilizing resistive heat build-up associated with charging/discharging. As a result, the required power value from the load device can be satisfied while attaining uniform temperature among the power storage units, whereby efficient temperature management of the power storage units as a whole is realized.

Preferably, the target power value determining means determines the target power value such that ratio of distribution of the required power value becomes smaller for a power storage unit of which temperature is relatively high as compared with another power storage unit.

Preferably, the target value determining means determines, for a power storage unit of a high temperature of which temperature difference from another power storage unit is not lower than a prescribed threshold, the corresponding target power value to be substantially zero.

Preferably, the power system in accordance with the present aspect further includes a state value obtaining means for obtaining a state value representing state of charge of each of the plurality of power storage units. The target power value determining means determines the target power value for each of the plurality of power storage units in accordance with the state values of the plurality of power storage units obtained by the state value obtaining means, in addition to the temperatures of the plurality of power storage units.

Preferably, the target power value determining means determines, for a power storage unit having relatively high state of charge as compared with another power storage unit, the target power value such that ratio of distribution of the required power value becomes larger when power is supplied from the power system to the load device, and the ratio of distribution of the required power value becomes smaller when power is supplied from the load device to the power system.

More preferably, each of the plurality of power storage units is implemented by a lithium ion battery.

Preferably, the plurality of power storage units are arranged in one same housing.

According to another aspect, the present invention provides a power system having a plurality of power storage units, each being rechargeable. The power system includes a power line electrically connecting a load device and the power system; a plurality of converter units provided between the plurality of power storage units and the power line, respectively, each being capable of controlling charging/discharging of the corresponding power storage unit; a battery temperature detecting unit for obtaining temperature of each of the plurality of power storage units; and a control unit for controlling the plurality of converter units. The control unit distributes required power value from the load device in accordance with temperatures of the plurality of power storage units obtained by the battery temperature detecting unit, determines target power value for each of the plurality of power storage units, and controls the plurality of converter units in accordance with the determined target power values.

According to a still further aspect, the present invention provides a vehicle that includes the power system described above and a driving force generating unit receiving power supply from the power system and generating driving force.

According to a still further aspect, the present invention provides a method of controlling a power system having a plurality of power storage units each being rechargeable. The power system includes a power line electrically connecting a load device and the power system, and a plurality of converter units provided between the plurality of power storage units and the power line, respectively, each being capable of controlling charging/discharging of the corresponding power storage unit. The control method includes: the temperature obtaining step of obtaining temperature of each of the plurality of power storage units; the target power value determining step of determining a target power value for each of the plurality of power storage units, by distributing required power value from the load device in accordance with temperatures of the plurality of power storage units obtained at the temperature obtaining step; and the converter control step of controlling the plurality of converter units in accordance with the target power value determined at the determining step.

According to the present invention, a power system allowing efficient temperature management of the power storage units as a whole by making uniform the temperature of power storage units while satisfying the required power value from the load device, a vehicle provided with the system and a method of controlling the same can be realized.

BEST MODES FOR CARRYING OUT THE INVENTION

Figure 1:
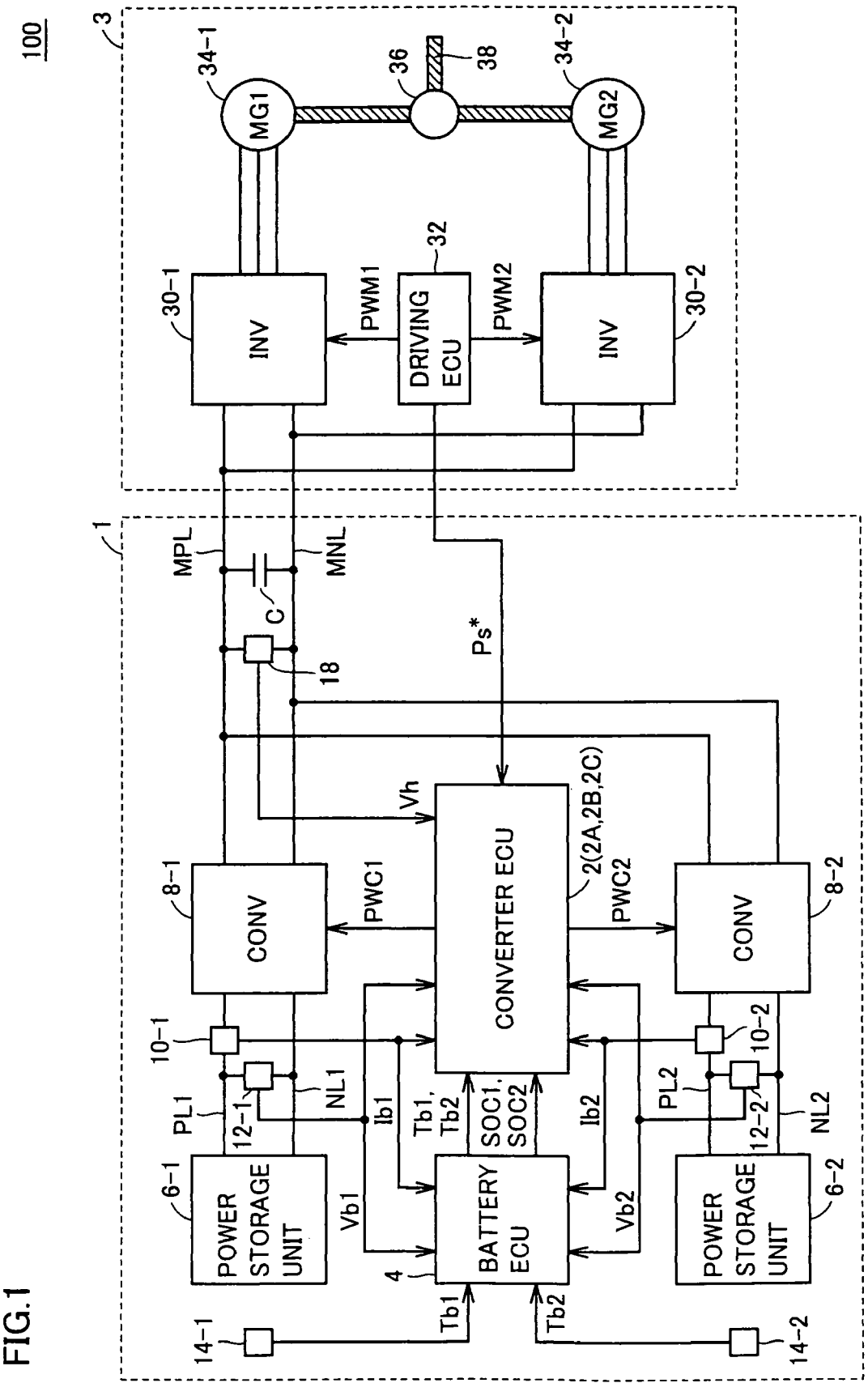
FIG. 1 schematically shows a configuration of a substantial portion of a vehicle provided with the power system in accordance with an embodiment of the present invention.

An embodiment of the present invention will be described in detail with reference to the figures. In the figures, the same or corresponding portions are denoted by the same reference characters and description thereof will not be repeated.

FIG. 1 schematically shows a configuration of a substantial portion of a vehicle 100 provided with the power system 1 in accordance with an embodiment of the present invention.

Referring to FIG. 1, in the present embodiment, a configuration will be described in which power is exchanged to/from a driving force generating unit 3 for generating the force for driving vehicle 10, as an example of a load device. Vehicle 100 travels as the driving force generated by driving force generating unit 3 receiving electric power supplied from power system 1 is transmitted to wheels (not shown).

In the present embodiment, power system 1 having two power storage units as an example of the plurality of power storage units, will be described. Power system 1 exchanges DC power to/from driving force generating unit 3 through a main positive line MPL and a main negative line MNL.

Driving force generating unit 3 includes inverters (INV) 30-1 and 30-2, a first motor generator (MG1) 34-1 and a second motor generator (MG2) 34-2, and generates driving force in response to switching commands PWM1 and PWM2 from a driving ECU (Electronic Control Unit) 32 as a control unit.

Motor generators 34-1 and 34-2 are capable of generating rotational driving force upon receiving AC power supplied from inverter units 30-1 and 30-2, respectively, and capable of generating AC power upon receiving external rotational driving force. By way of example, motor generators 34-1 and 34-2 are three-phase AC rotating electric machines having a rotor with embedded permanent magnet. Motor generators 34-1 and 34-2 are coupled to a power transmitting mechanism 36, respectively, and transmit generated driving force to the wheels (not shown) via a driving shaft 38.

Inverter units 30-1 and 30-2 are connected in parallel with main positive line MPL and main negative line MNL, and execute power-conversion between power system 1 and motor generators 34-1 and 34-2, respectively. As an example, inverter units 30-1 and 30-2 are implemented by a bridge circuit including switching elements of three phases, and perform switching operations (circuit opening and closing operations) in accordance with switching commands PWM1 and PWM2 received from driving ECU 32, respectively, to generate three-phase AC power.

When driving force generating unit 3 is applied to a hybrid vehicle, motor generators 34-1 and 34-2 are also mechanically coupled to an engine (not shown), by means of power transmitting mechanism 36 or driving shaft 38. Driving ECU 32 executes control such that the driving force generated by the engine and the driving force generated by motor generators 34-1 and 34-2 attain an optimal ratio. When applied to such a hybrid vehicle, it is possible to have one motor generator function solely as an electric motor and the other motor generator function solely as a generator.

Driving ECU 32 executes a program stored in advance, whereby target torques and target rotational speeds of motor generators 34-1 and 34-2 are calculated, based on signals transmitted from various sensors, state of running, change ratio of accelerator pedal position, a stored map and the like. Then, driving ECU 32 generates and applies to driving force generating unit 3 switching commands PWM1 and PWM2 such that the torques and rotational speeds of motor generators 34-1 and 34-2 attain the calculated target torques and target rotational speeds, respectively.

Further, driving ECU 32 calculates and outputs to power system 1 a required power value Ps* to be consumed or generated by driving force generating unit 3, based on the calculated target torques and target rotational speeds. Driving ECU 32 switches between instructions to supply power (positive value) from power system 1 to driving force generating unit 3 and instructions to supply power (negative value) from driving force generating unit 3 to power system 1, by changing the sign of the required power value Ps*.

Power system 1 includes a smoothing capacitor C, a supply voltage detecting unit 18, converter units (CONV) 8-1 and 8-2, power storage units 6-1 and 6-2, battery current detecting units 10-1 and 10-2, battery voltage detecting units 12-1 and 12-2, battery temperature detecting units 14-1 and 14-2, a battery ECU 14, and a converter ECU 2.

Smoothing capacitor C is connected between the main positive line MPL and main negative line MNL, and decreases fluctuating component (AC component) included in the power supplied from converter units 8-1 and 8-2.

Supply voltage detecting unit 18 is connected between the main positive line MPL and main negative line MNL, detects supply voltage Vh to driving force generating unit 3, and outputs the detected result to converter ECU 2.

Converter units 8-1 and 8-2 are formed to allow control of charging/discharging of corresponding power storage unit 6-1 and 6-2, respectively. Specifically, converter units 8-1 and 8-2 perform a voltage converting operation (step-up/down operation) between corresponding power storage units 6-1, 6-2 and main positive and negative lines MPL and MNL, respectively, whereby control charge/discharge of power storage units 6-1 and 6-2. Specifically, when power storage units 6-1 and 6-2 are to be charged, converter units 8-1 and 8-2 lower the voltage between the main positive line MPL and main negative line MNL and supply the charging power to power storage units 6-1 and 6-2, respectively. When power storage units 6-1 and 6-2 are to be discharged, converter units 8-1 and 8-2 boost battery voltages of power storage units 6-1 and 6-2, respectively, and supply the discharging power through main positive line MPL and main negative line MNL.

Figure 2:
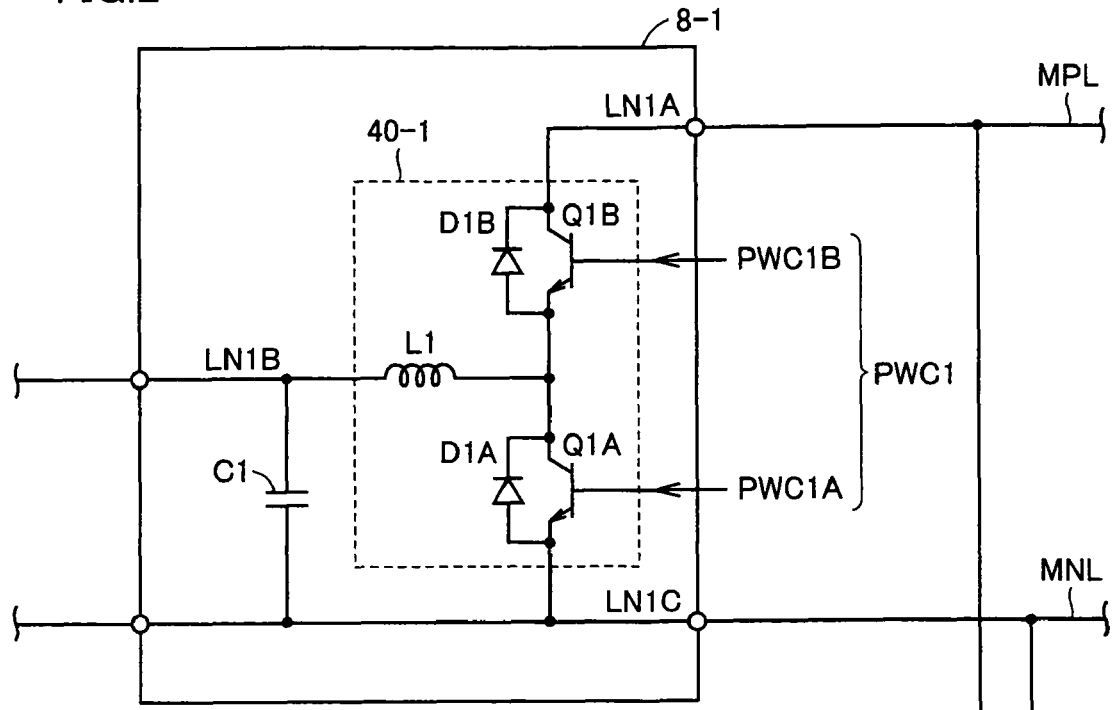
FIG. 2 schematically shows a converter unit in accordance with an embodiment of the present invention.
Figure 2:
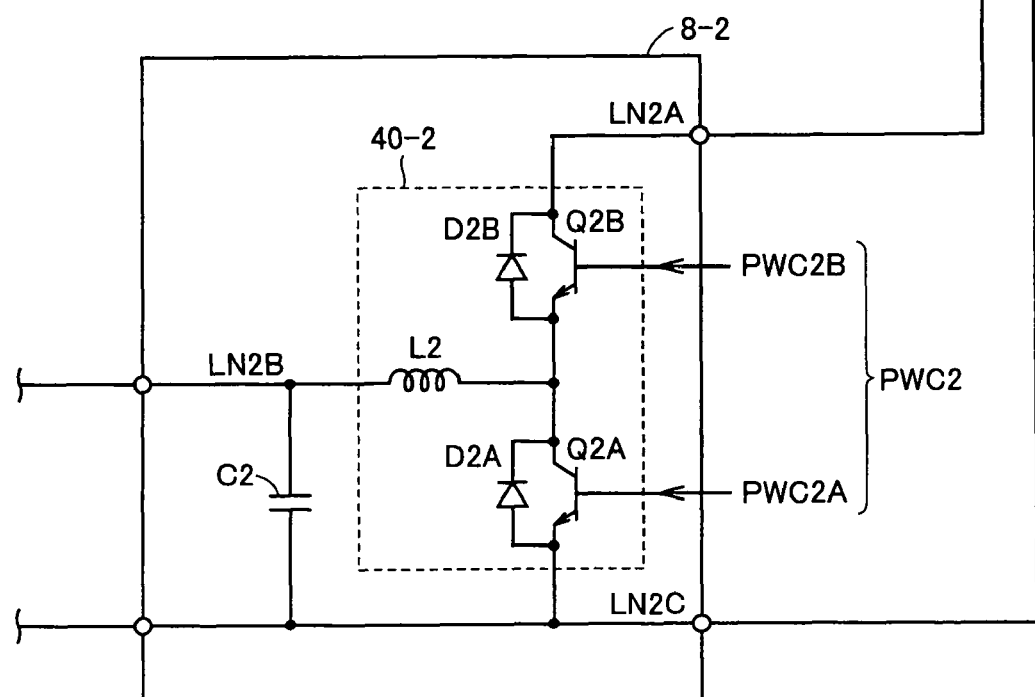

FIG. 2 schematically shows the configuration of converter units 8-1 and 8-2 in accordance with the embodiment of the present invention.

Referring to FIG. 2, by way of example, converter unit 8-1 is formed to include a bi-directional chopper circuit, and it is implemented by a chopper circuit 40-1 and a smoothing capacitor C1.

Chopper circuit 40-1 selectively executes the step-up operation and step-down operation in accordance with a lower arm switching command PWC1A and an upper arm switching command PWC1B included in switching command PWC1. Chopper circuit 40-1 includes a positive line LN1A, a negative line LN1C, a line LN1B, transistors Q1A and Q1B as switching elements, diodes D1A and D1B, and an inductor L1.

Positive line LN1A has one end connected to the collector of transistor Q1B and the other end connected to main positive line MPL. Further, negative line LN1C has one end connected to a negative side of power storage unit 6-1 (FIG. 1), and the other end connected to main negative line MNL.

Transistors Q1A and Q1B are connected in series between positive line LN1A and negative line LN1C. Transistor Q1B has its collector connected to positive line LN and transistor Q1B has its emitter connected to negative line LN1C. Between the collector and emitter of each of the transistors Q1A and Q1B, diodes D1A and D1B for causing current to flow from the emitter side to the collector side are connected, respectively. Further, inductor L1 is connected to the node between transistors Q1A and Q1B.

Line LN1B has one end connected to a positive side of power storage unit 6-1 (FIG. 1), and the other end connected to inductor L1.

Smoothing capacitor C1 is connected between line LN1B and negative line LN1C, and decreases AC component included in the DC voltage between line LN1B and negative line LN1C.

Converter 8-2 has the similar structure and operates in the similar manner as converter unit 8-1 described above and, therefore, detailed description thereof will not be repeated.

Again referring to FIG. 1, power storage units 6-1 and 6-2 are formed to be charged/discharged by converter units 8-1 and 8-2, respectively. By way of example, as power storage units 6-1 and 6-2 in accordance with the present embodiment, chemical battery such as a lithium ion battery, nickel hydride battery or a lead battery may be used, or a power storage element such as an electric double layer capacitor may be used. Power storage units 6-1 and 6-2 are packaged and mounted on vehicle 100.

Figure 3:
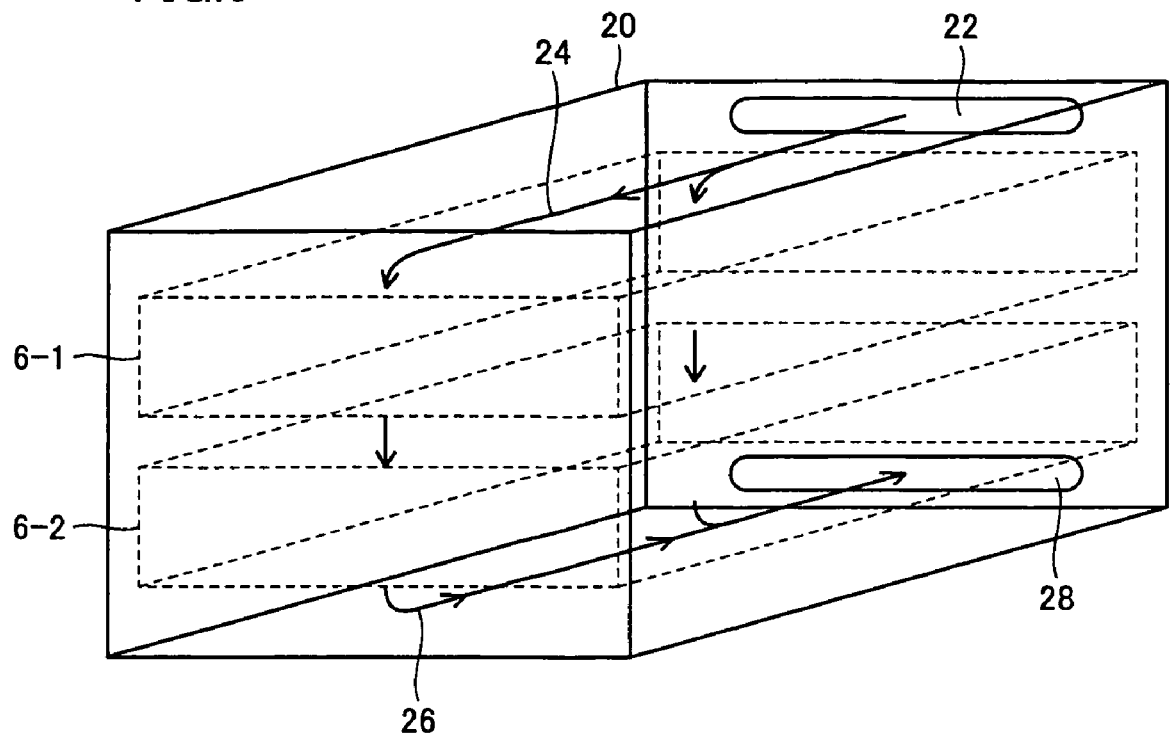
FIG. 3 is an illustration schematically showing a package structure of the power storage unit in accordance with the embodiment of the present invention.

FIG. 3 schematically shows the package structure of power storage units 6-1 and 6-2 in accordance with the embodiment of the present invention.

Referring to FIG. 3, power storage units 6-1 and 6-2 are arranged to be overlapped in the vertical direction in a battery pack 20 as a common housing. Further, on one side surface of battery pack 20, an inlet 22 for taking in cooling air 24 for cooling power storage units 6-1 and 6-2, and an outlet 28 for letting out the exhaust air 26 having been used for cooling power storage unit 6-1 and 6-2 are formed. By a blower mechanism (not shown), a cooling air flow is formed from inlet 22 through power storage units 6-1 and 6-2 to outlet 28. Through heat-exchange between the cooling air and power storage units 6-1 and 6-2, power storage units 6-1 and 6-2 are cooled.

In battery pack 20 shown in FIG. 3, two power storage units are arranged in a vertically overlapping manner and, therefore, space can be saved while cooling performance for power storage units tends to differ. Specifically, the cooling air that has cooled power storage unit 6-1 is thereafter fed to power storage unit 6-2 and, therefore, if the battery temperature of power storage unit 6-1 is relatively high or if the amount of cooling air is small, the temperature of cooling air supplied to power storage unit 6-2 tends to increase. As a result, the cooling performance for power storage unit 6-2 can be lower than the cooling performance for power storage unit 6-1. Such unevenness in temperature between power storage units 6-1 and 6-2 is suppressed by the method in accordance with the embodiment, which will be described later.

Again referring to FIG. 1, battery current detecting units 10-1 and 10-2 are each inserted to one line of a pair of power lines connecting power storage units 6-1 and 6-2 to converter units 8-1 and 8-2, respectively, detect battery currents Ib1 and Ib2 related to input/output of power storage units 6-1 and 6-2, and output the results of detection to converter ECU 2 and battery ECU 4.

Battery voltage detecting units 12-1 and 12-2 are each connected between a pair of power lines connecting power storage units 6-1 and 6-2 to converter units 8-1 and 8-2, detect battery voltages Vb1 and Vb2 of power storage units 6-1 and 6-2, and output the results of detection to converter ECU 2 and battery ECU 4.

Battery temperature detecting units 14-1 and 14-2 are arranged close to battery cells constituting power storage units 6-1 and 6-2, respectively, detect battery temperatures Tb1 and Tb2 as temperatures inside the power storage units 6-1 and 6-2, respectively, and output the detected results to battery ECU 4. Battery temperature detecting units 14-1 and 14-2 may be formed to output, based on the results of detection by a plurality of detecting elements arranged corresponding to a plurality of battery cells forming the power storage units 6-1 and 6-2, representative values obtained, for example, by an averaging process.

Battery ECU 4 is a controller that monitors the state of charge of power storage units 6-1 and 6-2. Specifically, battery ECU 4 receives battery current Ib1, battery voltage Vb1 and battery temperature Tb1 from battery current detecting unit 10-1, battery voltage detecting unit 12-1 and battery temperature detecting unit 14-1, respectively, and calculates a value representing the state of charge of power storage unit 6-1 (hereinafter also referred to as "SOC (State Of Charge) 1"). Similarly, battery ECU 4 receives battery current Ib2, battery voltage Vb2 and battery temperature Tb2, and calculates a value representing the state of charge of power storage unit 6-2 (hereinafter also referred to as "SOC2"). Further, battery ECU 4 outputs battery temperatures Tb1 and Tb2 in addition to calculated SOC1 and SOC2, to converter ECU 2.

Various known methods may be used for calculating SOC1 and SOC2. As an example, the value may be calculated using a tentative SOC calculated from an open-circuit voltage value and a corrected SOC calculated from integrated values of battery currents Ib1 or Ib2. Specifically, based on the battery currents Ib1 and Ib2 and battery voltages Vb1 and Vb2 at the time point, open-circuit voltage values of power storage units 6-1 and 6-2 are obtained and, thereafter, tentative SOCs of power storage units 6-1 and 6-2 are determined from values corresponding to the open-circuit voltage values on a standard charge/discharge characteristic, which is measured experimentally beforehand. Further, from the integrated values of battery currents Ib1 and Ib2, corrected SOCs are obtained, and by adding the corrected SOCs and tentative SOCs, SOC1 and SOC2 are calculated.

Converter ECU 2 is a controller controlling the voltage converting operation of converter units 8-1 and 8-2, so that the required power value Ps* applied from driving force generating unit 3 is satisfied. Specifically, converter ECU 2 adjusts duty ratios of switching commands PWC1 and PWC2 so that input/output power values of converter units 8-1 and 8-2 match the corresponding target power values.

Particularly, in the present embodiment, in order to suppress unevenness (temperature variation) of battery temperature between power storage units 6-1 and 6-2, converter ECU 2 distributes required power value Ps* in accordance with the battery temperatures Tb1 and Tb2, and determines target power value of each of power storage units 6-1 and 6-2. Specifically, more resistive heat builds up as the charge/discharge power at the power storage unit increases. Therefore, the target power is determined such that to a power storage device of which necessary temperature increase is relatively small, that is, a power storage unit having relatively high battery temperature as compared with other power storage unit or units, distribution of required power value Ps* becomes smaller. On the other hand, the target value is determined such that to a power storage unit of which necessary temperature increase is large, that is, a power storage unit having relatively low battery temperature as compared with other storage unit or units, distribution of required power value Ps* becomes larger.

As the target power values for respective power storage units 6-1 and 6-2 are determined by distributing required power value Ps* in accordance with battery temperatures Tb1 and Tb2, the required power value from the load device can be satisfied. At the same time, for a power storage unit having relatively high battery temperature, the target power value is made relatively small, so that deterioration caused by irregular increase of battery temperature can be avoided, and for a power storage unit having relatively low battery temperature, the target power value is made relatively large, so that decrease in charge/discharge performance caused by lower battery temperature can be avoided.

(Control Structure of Converter Ecu 2)

Figure 4:
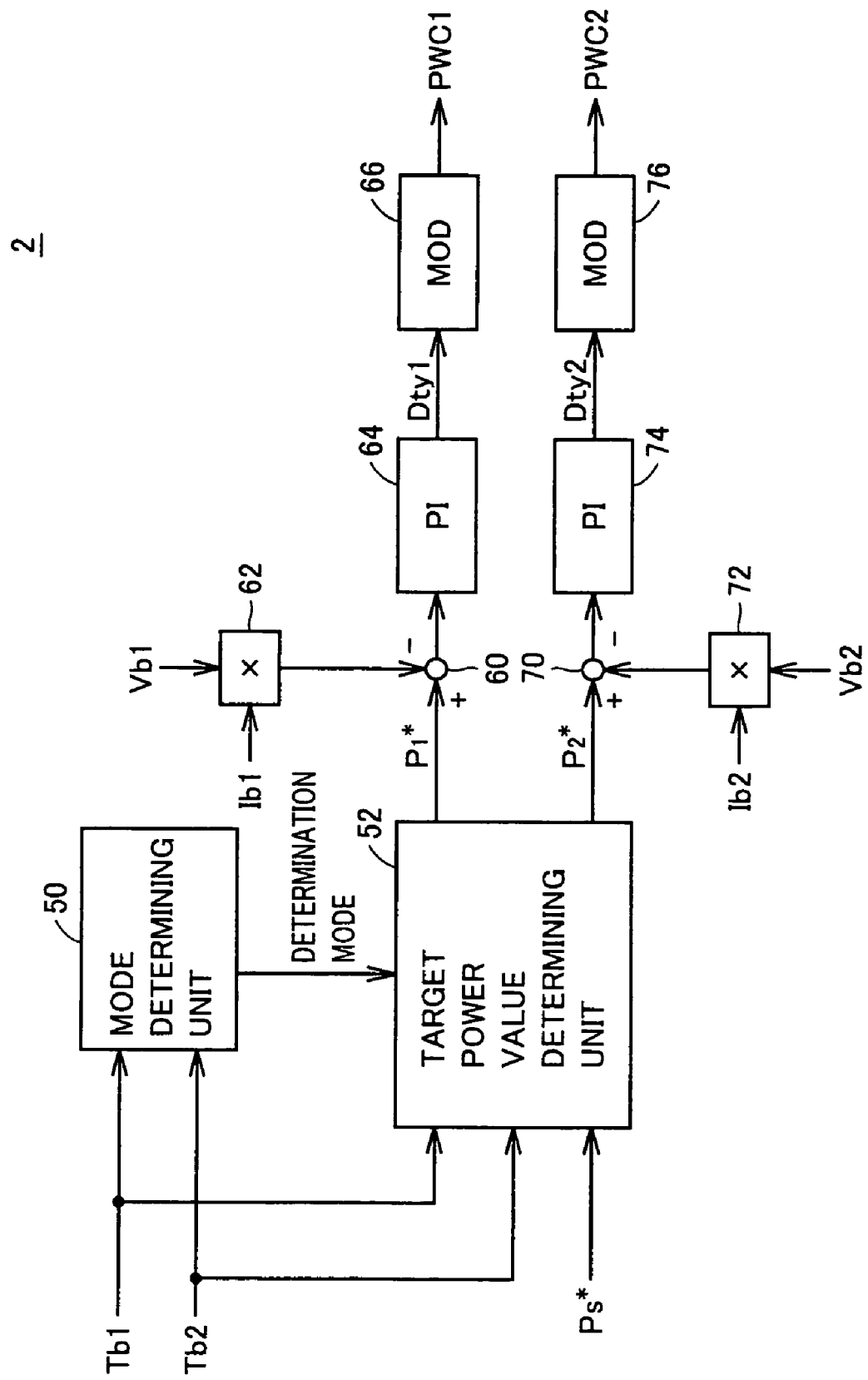
FIG. 4 is a block diagram showing a control structure in a converter ECU in accordance with an embodiment of the present invention.

FIG. 4 is a block diagram showing a control structure of converter ECU 2 in accordance with the embodiment of the present invention.

Referring to FIG. 4, the control structure of converter ECU 2 includes a mode deciding unit 50, a target power value determining unit 52, multiplying units 62 and 72, subtracting units 60 and 70, PI control units (PI) 64 and 74, and modulating units (MOD) 66 and 76.

Mode deciding unit 50 determines and instructs a determination mode for target power value determining unit 52, which will be described later, in accordance with battery temperatures Tb1 and Tb2 of power storage units 6-1 and 6-2.

Target power value determining unit 52 distributes the required power value Ps* from driving force generating unit 3 in accordance with battery temperatures Tb1 and Tb2, and determines and outputs target power values $P_1^*$ and $P_2^*$ for power storage units 6-1 and 6-2, respectively. The target power value determining unit 52 determines target power values $P_1^*$ and $P_2^*$ in accordance with a determination logic (which will be described later) selected in accordance with the determination mode instructed from mode deciding unit 50.

Multiplying unit 62 multiplies battery current Ib1 and battery voltage Vb1, and calculates actual power value $P_1$, which is the power actually charged or discharged by power storage unit 6-1.

Subtracting unit 60 and PI control unit 64 constitute a feedback control system to have the charge/discharge power of power storage unit 6-1 matched with target power value $P_1^*$. Specifically, subtracting unit 60 calculates a power deviation by subtracting actual power value $P_1$ output from multiplying unit 62 from the target power value $P_1^*$ output from target power value determining unit 52. PI control unit 64 is formed to include at least a proportional element (P) and an integral element (I), receives the power deviation output from subtracting unit 60, and generates a duty ratio Dty1 in accordance with a prescribed proportional gain and integration time.

Modulating unit 66 compares a carrier wave generated by an oscillating unit, not shown, with the duty ratio Dty1 from PI control unit 64, and generates a switching command PWC1. In accordance with the switching command PWC1, converter unit 8-1 executes a voltage converting operation such that the charge/discharge power of power storage unit 6-1 matches the target power value $P_1^*$.

Further, multiplying unit 72 multiplies battery current Ib2 and battery voltage Vb2, and calculates actual power value $P_2$, which is the power actually charged or discharged by power storage unit 6-2.

Subtracting unit 70 and PI control unit 74 constitute a feedback control system to have the charge/discharge power of power storage unit 6-2 matched with target power value $P_2^*$. Specifically, subtracting unit 70 calculates a power deviation by subtracting actual power value $P_2$ output from multiplying unit 72 from the target power value $P_2^*$ output from target power value determining unit 52. PI control unit 74 is formed to include at least a proportional element and an integral element, receives the power deviation output from subtracting unit 70, and generates a duty ratio Dty2 in accordance with a prescribed proportional gain and integration time.

Modulating unit 76 compares a carrier wave generated by an oscillating unit, not shown, with the duty ratio Dty2 from PI control unit 74, and generates a switching command PWC2. In accordance with the switching command PWC2, converter unit 8-2 executes a voltage converting operation such that the charge/discharge power of power storage unit 6-2 matches the target power value $P_2^*$.

FIGS. 5A to 5D are block diagrams showing determination logics at a target power value determining unit shown in FIG. 4.

Figure 5A:
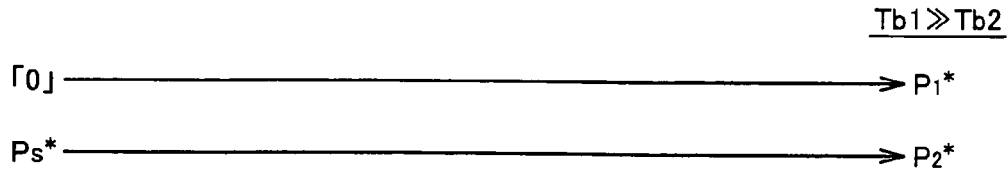
FIGS. 5A to 5D are block diagrams showing determination logics at a target power value determining unit shown in FIG. 4.
Figure 5B:
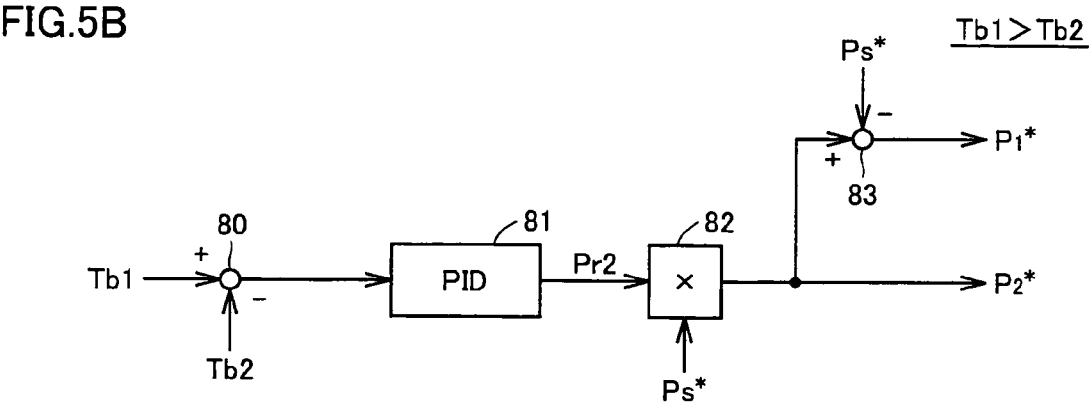
Figure 5C:
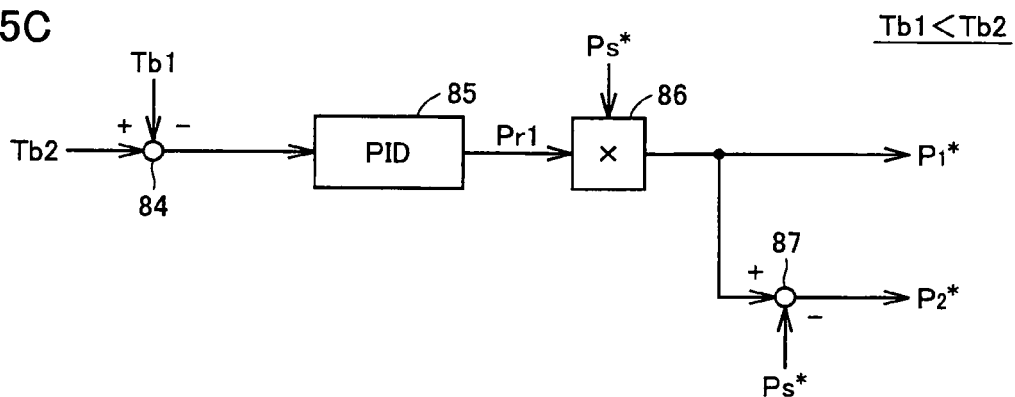
Figure 5D:
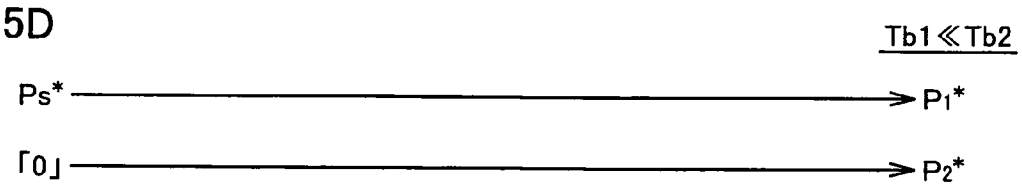

FIG. 5A shows a determination logic selected when battery temperature Tb1>>battery temperature Tb2. FIG. 5B shows a determination logic selected when battery temperature Tb1>battery temperature Tb2. FIG. 5C shows a determination logic selected when battery temperature Tb1<battery temperature Tb2. FIG. 5D shows a determination logic selected when battery temperature Tb1<<battery temperature Tb2.

Mode deciding unit 50 (FIG. 4) instructs target power value determining unit 52 to select any one of the determination logics shown in FIGS. 5A to 5D, in accordance with relative magnitude relation between battery temperatures Tb1 and Tb2.

Referring to FIG. 5A, when battery temperature Tb1>>battery temperature Tb2 is satisfied, that is, when power storage unit 6-1 is at a high temperature with temperature difference equal to or higher than a prescribed threshold value from power storage unit 6-2, the target power value $P_1^*$ for power storage unit 6-1 is set to zero ("0"), and the target power value $P_2^*$ for power storage unit 6-2 is set equal to the required power value Ps*. Then, charge/discharge power at power storage unit 6-1 attains to zero and, therefore, resistive heat is not generated in power storage unit 6-1. Hence, temperature increase can be prevented. On the other hand, required power value Ps* fully flows to power storage unit 6-2 and, therefore, maximum resistive heat can be generated within the range that satisfies the required power value Ps* of driving force generating unit 3, and hence, temperature of power storage unit 6-2 can be increased significantly.

Referring to FIG. 5B, when battery temperature Tb1>battery temperature Tb2 is satisfied, required temperature increase for power storage unit 6-2 becomes relatively large. Therefore, the target power value $P_2^*$ for power storage unit 6-2 is determined with priority.

Specifically, the determination logic shown in FIG. 5B includes subtracting units 80 and 83, a PID control unit (PID) 81, and a multiplying unit 82. Subtracting unit 80 calculates temperature deviation between battery temperature Tb1 and battery temperature Tb2 (battery temperature Tb1−battery temperature Tb2). PID control unit 81 is formed to include a proportional element (P), an integral element (I), and a differential element (D), receives the temperature deviation output from subtracting unit 80, and calculates a distribution ratio Pr2 in accordance with a prescribed proportional gain, integration time and derivative time.

Multiplying unit 82 multiplies the required power value Ps* by the distribution ratio Pr2 from PID control unit 81, and determines the result to be the target power value $P_2^*$ for power storage unit 6-2. Further, subtracting unit 83 subtracts the target power value $P_2^*$ determined by multiplying unit 82 from required power value Ps*, and determines the result to be the target power value $P_1^*$ for power storage unit 6-1.

Referring to FIG. 5C, when battery temperature Tb1<battery temperature Tb2 is satisfied, required temperature increase for power storage unit 6-1 becomes relatively large. Therefore, the target power value $P_1^*$ for power storage unit 6-1 is determined with priority.

Specifically, the determination logic shown in FIG. 5C includes subtracting units 84 and 87, a PID control unit (PID) 85, and a multiplying unit 86. Subtracting unit 84 calculates temperature deviation between battery temperature Tb2 and battery temperature Tb1 (battery temperature Tb2−battery temperature Tb1). PID control unit 85 is formed to include a proportional element (P), an integral element (I), and a differential element (D), receives the temperature deviation output from subtracting unit 84, and calculates a distribution ratio Pr1 in accordance with a prescribed proportional gain, integration time and derivative time.

Multiplying unit 86 multiplies the required power value Ps* by the distribution ratio Pr1 from PID control unit 85, and determines the result to be the target power value $P_1^*$ for power storage unit 6-1. Further, subtracting unit 87 subtracts the target power value $P_1^*$ determined by multiplying unit 86 from required power value Ps*, and determines the result to be the target power value $P_2^*$ for power storage unit 6-2.

Referring to FIG. 5D, when battery temperature Tb1<<battery temperature Tb2 is satisfied, that is, when power storage unit 6-2 is at a high temperature with temperature difference equal to or higher than a prescribed threshold value from power storage unit 6-1, the target power value $P_2^*$ for power storage unit 6-2 is set to zero ("0"), and the target power value $P_1^*$ for power storage unit 6-1 is set equal to the required power value Ps*. Then, as described with reference to FIG. 5A, temperature increase at power storage unit 6-2 is prevented and the temperature of power storage unit 6-1 can significantly be increased.

When battery temperature Tb1≈battery temperature Tb2 is satisfied, target power values $P_1^*$ and $P_2^*$ are both determined to be 50% of required power value Ps*.

Figure 6:
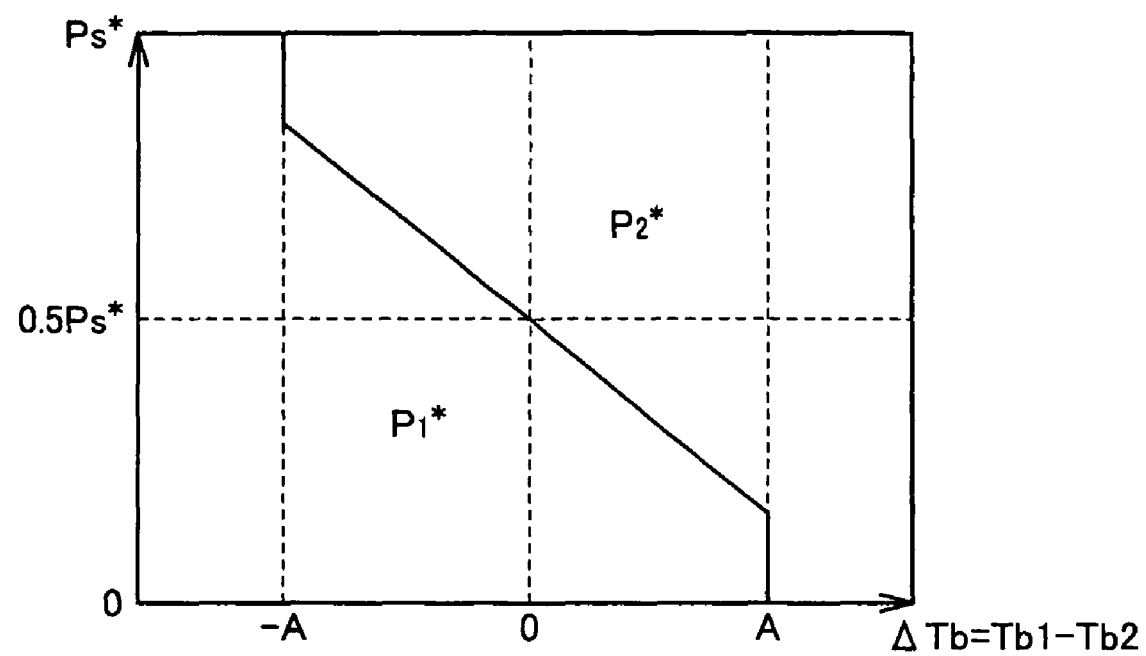
FIG. 6 is a graph representing a distribution relation of target power values in accordance with the embodiment of the present invention.

FIG. 6 is a graph representing a distribution relation of target power values $P_1^*$ and $P_2^*$ in accordance with the embodiment of the present invention. When the determination logic is selected as shown in FIG. 5B or FIG. 5C, target power value determining unit 52 includes PID control units 81 or 85 and, therefore, actual target power values $P_1^*$ and $P_2^*$ change transitionally. FIG. 6, however, shows typical target power values $P_1^*$ and $P_2^*$ in a steady state.

Referring to FIG. 6, if the absolute value of temperature deviation $\Delta Tb$ (=battery temperature Tb1−battery temperature Tb2) is within the range of threshold value A, that is, if the relation $-A \leqq$ temperature difference $\Delta Tb \leqq A$ is satisfied, target power values $P_1^*$ and $P_2^*$ are determined such that distribution ratio of the power storage unit of higher battery temperature becomes smaller. On the other hand, if the absolute value of temperature deviation $\Delta Tb$ (=battery temperature Tb1−battery temperature Tb2) is out of the range of threshold value A, that is, if relation of temperature difference $\Delta Tb < -A$ or $A <$ temperature difference $\Delta Tb$ is satisfied, one of the target power values $P_1^*$ and $P_2^*$ is determined to be zero, and the other is determined to be Ps*.

As shown in FIG. 6, target power values $P_1^*$ and $P_2^*$ are determined by distributing required power value Ps* and, therefore, the sum of target power values $P_1^*$ and $P_2^*$ is always equals to the required power value Ps*. Therefore, in the power system 1 in accordance with the present embodiment, the required power value Ps* from driving force generating unit 3 can be satisfied regardless of the difference in battery temperatures of power storage units 6-1 and 6-2.

Figure 7:
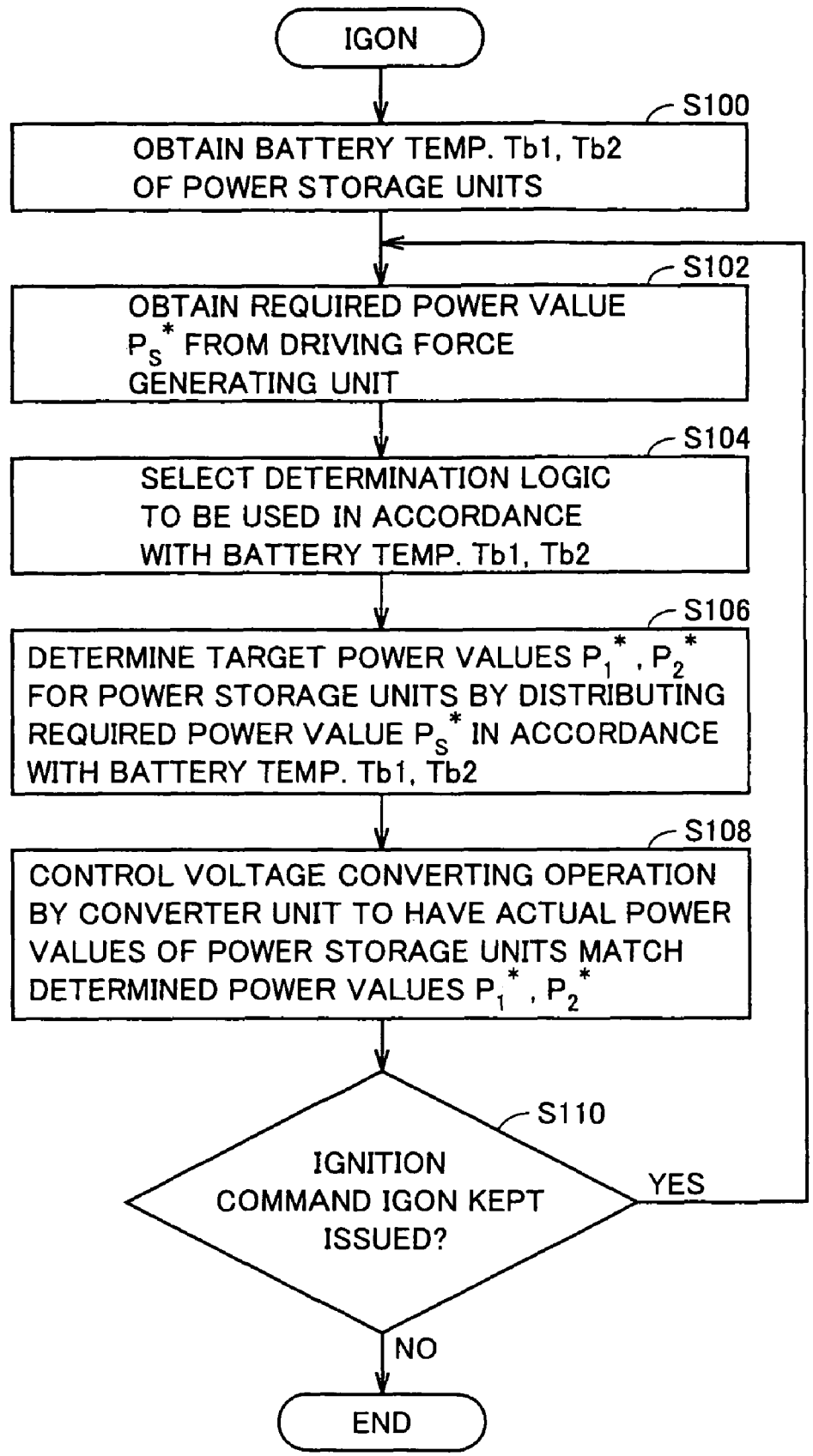
FIG. 7 is a flowchart representing process steps of the control method in accordance with an embodiment of the present invention.

FIG. 7 is a flowchart representing process steps of the control method in accordance with the embodiment of the present invention. The flowchart shown in FIG. 7 is implemented by converter ECU 2 executing the program.

Referring to FIG. 7, when an ignition command IGON of vehicle 100 is issued by a driver, converter ECU 2 obtains battery temperatures Tb1 and Tb2 of power storage units 6-1 and 6-2 (step S100). Further, converter ECU 2 obtains required power value Ps* from driving force generating unit 3 (step S102).

Thereafter, converter ECU 2 selects a determination logic to be used, in accordance with the obtained battery temperatures Tb1 and Tb2 (step S104). Then, converter ECU 2 distributes the required power value Ps* in accordance with battery temperatures Tb1 and Tb2 by the selected determination logic, and determines target power values $P_1^*$ and $P_2^*$ for power storage units 6-1 and 6-2, respectively (step S106). Further, converter ECU 2 controls the voltage converting operation of converter units 8-1 and 8-2 such that the actual power values of power storage units 6-1 and 6-2 match the determined target power values $P_1^*$ and $P_2^*$, respectively (step S108).

Then, converter ECU 2 determines whether the ignition command IGON has been issued continuously or not (step S110). If the ignition command IGON has been continuously issued (YES at step S110), converter ECU 2 repeatedly executes steps S102 to S110 described above. If issuance of the ignition command IGON has been terminated (NO at step S110), converter ECU 2 ends the process.

The correspondence between the present embodiment and the invention is as follows: driving force generating unit 3 corresponds to the "load device", main positive line MPL and main negative line MNL correspond to the "power line", and converters 8-1 and 8-2 correspond to the "plurality of converter units." Further, converter ECU 2 provides with the "target power value determining means" and the "converter control means", battery temperature detecting units 14-1 and 14-2 provides with the "temperature obtaining means" and battery ECU 4 provide with the "state value obtaining means."

According to the embodiment of the present invention, the target power values $P_1^*$ and $P_2^*$ for respective ones of power storage units 6-1 and 6-2 are determined by distribution of required power value Ps* from driving force generating unit 3 in accordance with battery temperatures Tb1 and Tb2. Then, converter units 8-1 and 8-2 are controlled such that charging/discharging takes place in each of the power storage units 6-1 and 6-2 in accordance with the corresponding target power values. As the relation of required power value Ps*=target power value $P_1^*$+target power value $P_2^*$ is satisfied, the required power value Ps* from driving force generating unit 3 is always satisfied when the power system is viewed as a whole.

Further, according to the embodiment of the present invention, by setting the target power value to a relatively small value or zero for the power storage unit having relatively high battery temperature, degradation of the power storage device caused by excessive increase of battery temperature can be avoided.

Further, according to the embodiment of the present invention, by setting the target power value to a relatively high value for a power storage unit having relatively low battery temperature, decrease of charge/discharge performance of the power storage unit because of low battery temperature can be avoided.

[First Modification]

In power system 1 of the embodiment of the present invention described above, in place of the determination logic used for determining target power values $P_1^*$ and $P_2^*$, a different determination logic may be used. In the following, a configuration in accordance with the first modification of the present embodiment will be described, in which the target power values $P_1^*$ and $P_2^*$ are determined by distributing the required power value Ps* in accordance with battery temperatures Tb1 and Tb2.

The configuration of power system in accordance with the first modification of the embodiment of the invention corresponds to the power system in accordance with the embodiment of the invention shown in FIG. 1 with converter ECU 2 replaced by a converter ECU 2A of which contents of processing are different, and except for this point, it is the same as that of FIG. 1. Therefore, detailed description thereof will not be repeated.

Figure 8:
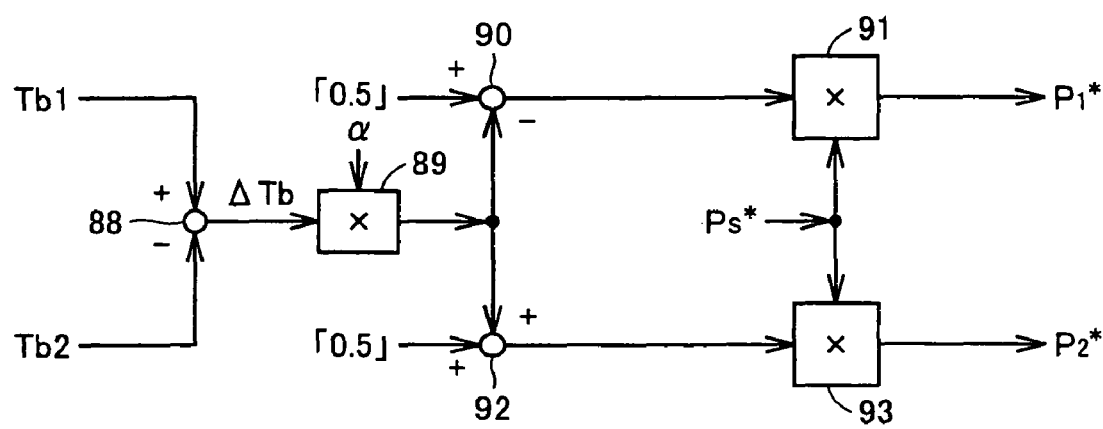
FIG. 8 shows a substantial portion of the control structure of the converter ECU in accordance with a first modification of the embodiment of the present invention.

FIG. 8 shows a substantial portion of the control structure in converter ECU 2A in accordance with the first modification of the embodiment of the present invention. In the first modification, it is unnecessary to provide mode deciding unit 50 such as shown in FIG. 4 in converter ECU 2A.

Referring to FIG. 8, converter ECU 2A changes the distribution ratio of required power value Ps* in accordance with temperature deviation $\Delta Tb$ between battery temperatures Tb1 and Tb2 of power storage units 6-1 and 6-2 (FIG. 1), and target power values $P_1^*$ and $P_2^*$ for respective power storage units 6-1 and 6-2 are determined accordingly. More specifically, the control structure of converter ECU 2A includes subtracting units 88 and 90, an adding unit 92, and multiplying units 89, 91 and 93.

Subtracting unit 88 subtracts battery temperature Tb2 from battery temperature Tb1 to calculate temperature deviation $\Delta Tb$ (battery temperature Tb1−battery temperature Tb2). Multiplying unit 89 outputs a correction value obtained by multiplying the temperature deviation $\Delta Tb$ calculated by subtracting unit 88 by a coefficient $\alpha$.

Subtracting unit 90 calculates the distribution ratio of required power value Ps* to determine the target power value $P_1^*$, while adding unit 92 calculates distribution ratio of required power value Ps* to determine the target power value $P_{2*}^-$.

Specifically, subtracting unit 90 subtracts the correction value ($\alpha \cdot \Delta Tb$) calculated by multiplying unit 89 from "0.5"

(50%), and outputs the result as a distribution ratio for the target power value $P_1^*$. Then, multiplying unit 91 outputs a value obtained by multiplying the required power value Ps* by the distribution ratio calculated at subtracting unit 90, as the target power value $P_1^*$. Therefore, the target power value $P_1^*$ is given as $P_1^* = (0.5 - \alpha \cdot (Tb1 - Tb2)) \times Ps^*$.

Further, adding unit 92 adds the correction value ($\alpha \cdot \Delta Tb$) calculated by multiplying unit 89 to "0.5" (50%), and outputs the result as a distribution ratio for the target power value $P_2^*$. Then, multiplying unit 93 outputs a value obtained by multiplying the required power value Ps* by the distribution ratio calculated at adding unit 92 as the target power value $P_2^*$. Therefore, the target power value $P_2^*$ is given as $P_2^* = (0.5 + \alpha \cdot (Tb1 - Tb2)) \times Ps^*$.

Between the target power values $P_1^*$ and $P_2^*$ calculated by the control structure as such and the required power value Ps*, the relation of $P_1^* + P_2^* = Ps^*$ holds. Therefore, the required power value Ps* from driving force generating unit 3 is always satisfied regardless of the difference of battery temperatures Tb1 and Tb2 of power storage units 6-1 and 6-2.

Further, as in the embodiment of the present invention described above, when battery temperature Tb1>battery temperature Tb2, relations of target power value $P_1^* < 0.5 Ps^*$ and target power value $P_{2^*} > 0.5 Ps^*$ are satisfied. Further, when battery temperature Tb1<battery temperature Tb2, relations of target power value $P_1^* > 0.5 Ps^*$ and target power value $P_2^* < 0.5 Ps^*$ are satisfied. Specifically, for a power storage unit having higher battery temperature as compared with other power storage unit or units, the target power value is determined such that the ratio of distribution of required power value Ps* is made smaller, and for a power storage unit having lower battery temperature as compared with other power storage unit or units, the target power value is determined such that the ratio of distribution of required power value Ps* is made larger.

According to the first modification of the embodiment of the present invention, similar effects as those of the embodiment described above can be attained and, in addition, the process of determining target power values $P_1^*$ and $P_2^*$ can be simplified.

[Second Modification]

In the embodiment of the present invention and the first modification thereof described above, configurations of determining target power values $P_1^*$ and $P_2^*$ by distributing the required power value Ps* in accordance with battery temperatures Tb1 and Tb2 have been described. Dependent on the type of battery forming the power storage unit, it is desirable to determine target power values $P_1^*$ and $P_2^*$ in accordance with the state of charge.

The configuration of power system in accordance with the second modification of the embodiment of the invention corresponds to the power system in accordance with the embodiment of the invention shown in FIG. 1 with converter ECU 2 replaced by a converter ECU 2B of which contents of processing are different, and except for this point, it is the same as that of FIG. 1. Therefore, detailed description thereof will not be repeated.

Particularly, in the second modification and the third modification, which will be described later, the power storage units 6-1 and 6-2 are both implemented by lithium ion batteries. A lithium ion battery has such a characteristic that it degrades rapidly if an almost fully charged state, that is, high SOC, continues. Therefore, power storage units 6-1 and 6-2 implemented by lithium ion batteries should be maintained at an appropriate SOC.

In a power system having a plurality of power storage units, it is not always the case that power storage units have approximately the same SOC. For instance, if one power storage unit has SOC higher than the other power storage unit, and the same target power value is set, the power storage unit originally having high SOC comes to have higher SOC because of charging, and deterioration of the power storage unit may proceed rapidly. Therefore, it is desirable to maintain the power storage units as a whole at an appropriate SOC, by reducing unevenness among the power storage units.

Therefore, in the power system in accordance with the second modification of the embodiment of the present invention, for a power storage unit having higher SOC as compared with other power storage unit or units, a larger power target value is determined to positively lower the SOC at the time of power supply from the power system to the driving force generating unit 3, and increase of SOC is prevented by determining a smaller power target value at the time of power supply from the driving force generating unit 3 to the power system.

Figure 9:
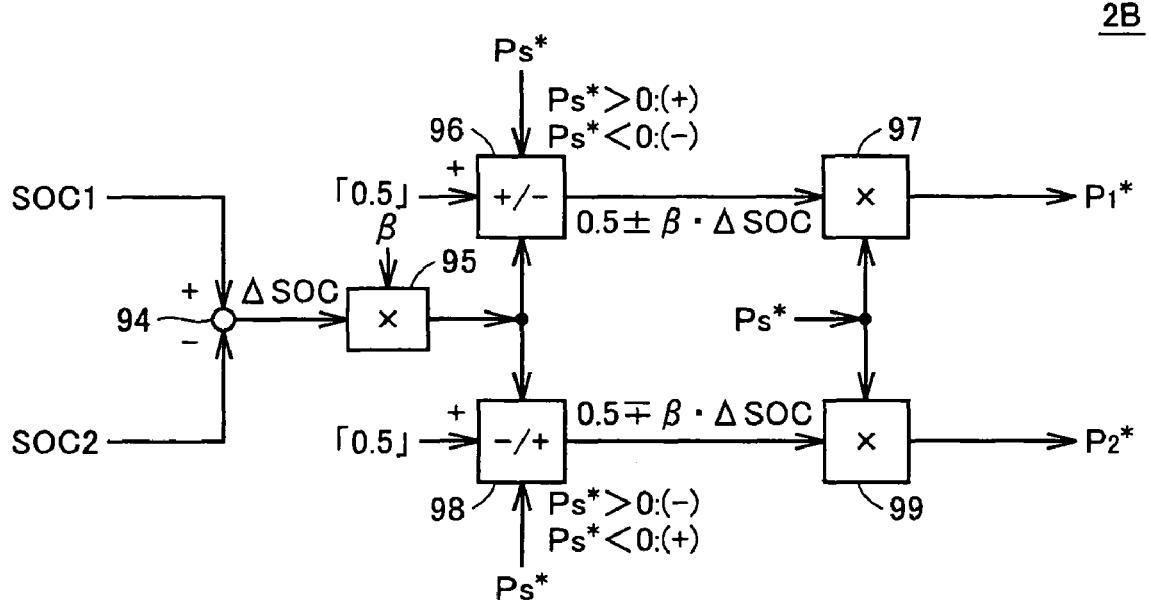
FIG. 9 shows a substantial portion of the control structure of the converter ECU in accordance with a second modification of the embodiment of the present invention.

FIG. 9 shows a substantial portion of the control structure in converter ECU 2B in accordance with the second modification of the embodiment of the present invention. In the second modification, it is unnecessary to provide mode deciding unit 50 such as shown in FIG. 4 in converter ECU 2B.

Referring to FIG. 9, in converter ECU 2B, in accordance with a state deviation $\Delta SOC$ between SOC1 and SOC2 representing the states of charge of power storage units 6-1 and 6-2 (FIG. 1), the distribution ratio of required power value Ps* is changed, and target power values $P_1^*$ and $P_2^*$ for the power storage units 6-1 and 6-2 are determined, respectively. More specifically, the control structure of converter ECU 2B includes a subtracting unit 94, multiplying units 95, 97 and 99, and adding/subtracting units 96 and 98.

Subtracting unit 94 subtracts SOC2 of power storage unit 6-2 from SOC 1 of power storage unit 6-1 obtained from battery ECU 4 (FIG. 1) to calculate the state deviation $\Delta SOC$ (SOC1−SOC2). Multiplying unit 95 multiplies the state deviation $\Delta SOC$ calculated by subtracting unit 94 by a coefficient $\beta$, and outputs the resulting correction value.

Adding/subtracting unit 96 calculates the distribution ratio of required power value Ps* to determine target power value $P_1^*$, and adding/subtracting unit 96 calculates the distribution ratio of required power value Ps* to determine target power value $P_2^*$. Adding/subtracting units 96 and 98 are both operating units selectively executing addition or subtraction dependent on the sign of required power value Ps*. More specifically, adding/subtracting unit 96 functions as an "adder" when the required power value Ps* is a positive value, that is, when the power is supplied from the power system to the driving force generating unit 3. On the other hand, adding/subtracting unit 96 functions as a "subtractor" when the required power value Ps* is a negative value, that is, when the power is supplied from the driving force generating unit 3 to the power system. Adding/subtracting unit 98 functions as an "adder" when the required power value Ps* is a negative value, and functions as a "subtractor" when the required power value Ps* is a positive value. In the following, operations dependent on the sign of required power value Ps* will be described.

(i) When power is supplied from the power system to driving force generating unit 3 (required power value Ps*>0)

Adding/subtracting unit 96 adds the correction value ($\beta \cdot \Delta SOC$) calculated by multiplying unit 95 to "0.5" (50%), and outputs the result as a distribution ratio for the target power value $P_1^*$. Further, adding/subtracting unit 98 subtracts the correction value ($\beta \cdot \Delta SOC$) calculated by multiplying unit 95 from "0.5" (50%), and outputs the result as a distribution ratio for the target power value $P_2^*$. Multiplying unit 97 outputs a value obtained by multiplying the required power value Ps* by the distribution ratio calculated by adding/subtracting unit 96 as the target power value $P_1^*$, and multiplying unit 99 outputs a value obtained by multiplying the required power value Ps* by the distribution ratio calculated by adding/subtracting unit 98 as the target power value $P_2^*$.

Therefore, the target power values are given as: $P_1^*=(0.5+\beta\cdot(SOC1-SOC2))\times Ps^*$, and $P_2^*=(0.5-\beta\cdot(SOC1-SOC2))\times Ps^*$.

(ii) When power is supplied from driving force generating unit 3 to the power system (required power value Ps*<0)

Adding/subtracting unit 96 subtracts the correction value ($\beta\cdot\Delta SOC$) calculated by multiplying unit 95 from "0.5" (50%), and outputs the result as a distribution ratio for the target power value $P_1^*$. Further, adding/subtracting unit 98 adds the correction value ($\beta\cdot\Delta SOC$) calculated by multiplying unit 95 to "0.5" (50%), and outputs the result as a distribution ratio for the target power value $P_2^*$. Processes at multiplying units 97 and 99 are the same as those described above.

Therefore, the target power values are given as: $P_1^*=(0.5-\beta\cdot(SOC1-SOC2))\times Ps^*$, and $P_2^*=(0.5+\beta\cdot(SOC1-SOC2))\times Ps^*$.

As described above, both in situations (i) and (ii), the relation of $P_1^*+P_2^*=Ps^*$ holds. Therefore, the required power value Ps* from driving force generating unit 3 is always satisfied regardless of the unevenness of SOC1 and SOC2 of power storage units 6-1 and 6-2.

According to the second modification of the embodiment of the present invention, target power values $P_1^*$ and $P_2^*$ for the power storage units 6-1 and 6-2 are determined by distributing required power value Ps* from driving force generating unit 3 in accordance with SOC1 and SOC2, respectively. As the relation of required power value Ps*=target power value $P_1^*$+target power value $P_2^*$ is satisfied, the required power value Ps* from driving force generating unit 3 is always satisfied when the power system is viewed as a whole.

Further, according to the second modification of the embodiment, for the power storage unit of which SOC is relatively high, larger target power value is set when the discharge from the power storage device is required, to positively lower the SOC and, at the time when charging to the storage unit is required, a smaller target power value is set, to prevent increase of SOC. Thus rapid degradation of the power storage unit caused by excessive increase of SOC can be avoided.

[Third Modification]

Further, a determination logic having characteristic configurations of both the first and second modifications of the embodiment described above may be adopted.

The configuration of power system in accordance with the third modification of the embodiment of the invention corresponds to the power system in accordance with the embodiment of the invention shown in FIG. 1 with converter ECU 2 replaced by a converter ECU 2C of which contents of processing are different, and except for this point, it is the same as that of FIG. 1. Therefore, detailed description thereof will not be repeated.

Figure 10:
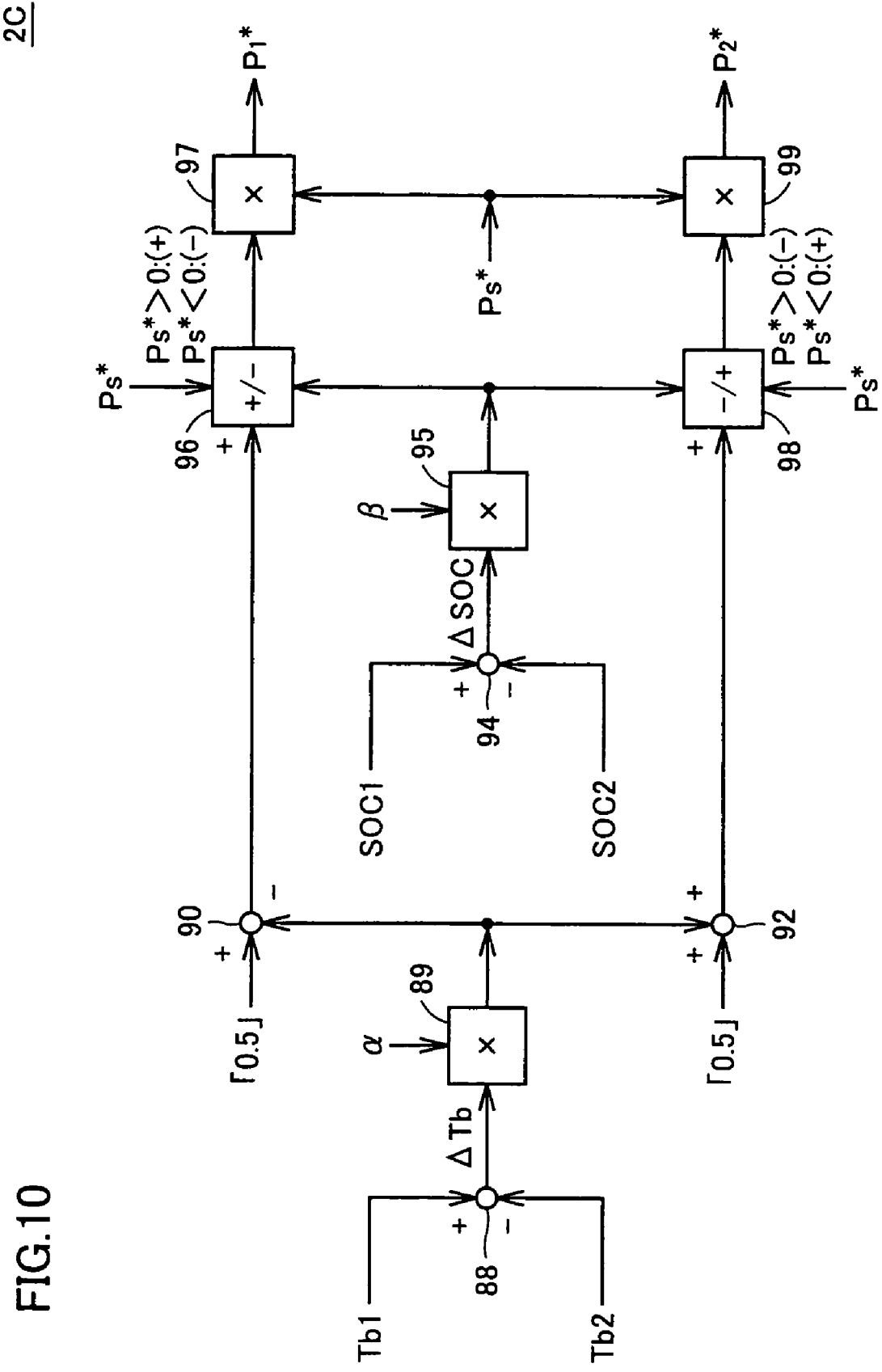
FIG. 10 shows a substantial portion of the control structure of the converter ECU in accordance with a third modification of the embodiment of the present invention.

FIG. 10 shows a substantial portion of the control structure in converter ECU 2C in accordance with the third modification of the embodiment of the present invention. In the third modification, it is unnecessary to provide mode deciding unit 50 such as shown in FIG. 4 in converter ECU 2C.

Referring to FIG. 10, the control structure of converter ECU 2C is equivalent to the control structure of converter ECU 2B shown in FIG. 9 additionally having subtracting units 88 and 90, multiplying unit 89 and adding unit 92 of the control structure of converter ECU 2A shown in FIG. 8. Specifically, the target power values $P_1^*$ and $P_2^*$ calculated by the control structure of converter ECU 2C are represented as follows.

(i) When power is supplied from the power system to driving force generating unit 3 (required power value Ps*>0)

Target power value $P_1^*=(0.5-\alpha\cdot(Tb1-Tb2)+\beta\cdot(SOC1-SOC2))\times Ps^*$ Target power value $P_2^*=(0.5+\alpha\cdot(Tb1-Tb2)-\beta\cdot(SOC1-SOC2))\times Ps^*$.

(ii) When power is supplied from driving force generating unit 3 to the power system (required power value Ps*<0)

Target power value $P_1^*=(0.5-\alpha\cdot(Tb1-Tb2)-\beta\cdot(SOC1-SOC2))\times Ps^*$ Target power value $P_2^*=(0.5+\alpha\cdot(Tb1-Tb2)+\beta\cdot(SOC1-SOC2))\times Ps^*$.

Further, both in situations (i) and (ii), the relation of $P_1^*+P_2^*=Ps^*$ holds. Therefore, the required power value Ps* from driving force generating unit 3 is always satisfied regardless of the unevenness of SOC1 and SOC2 of power storage units 6-1 and 6-2.

According to the third modification of the embodiment of the present invention, the effects of the first modification and the effects of the second modification of the embodiment of the present invention can be attained simultaneously.

Though a power system having two power storage units has been described in the embodiment of the present invention and in the modifications thereof, the present invention can be extended to a power system having three or more power storage units.

Further, though a configuration using a driving force generating unit including two motor generators has been described as an example of the load device in the embodiment of the present invention and in the modifications thereof, the number of motor generators is not restricted. The load device is not restricted to the driving force generating unit generating the force for driving the vehicle, and it may be a device that consumes power only, or a device capable of power consumption and power generation.

Although the present invention has been described and illustrated in detail, it is clearly understood that the same is by way of illustration and example only and is not to be taken by way of limitation, the scope of the present invention being construed by the terms of the appended claims.

The invention claimed is:

1. A power system having a plurality of power storage units each being rechargeable, comprising:
   a power line electrically connecting a load device and said power system;
   a plurality of converter units provided between said plurality of power storage units and said power line, respectively, each being capable of controlling charging/discharging of a corresponding power storage unit;
   temperature obtaining unit for obtaining a temperature of each of said plurality of power storage units;
   target power value determining unit for determining a target power value for each of said plurality of power storage units, by distributing a required power value from said load device in accordance with temperatures of said plurality of power storage units obtained by said temperature obtaining unit; and converter control unit for controlling said plurality of converter units in accordance with said target power value determined by said target power value determining unit, wherein said target power value determining unit determines said target power value such that a difference in distributed power value between a power storage unit and another power storage unit gradually increases/decreases with an increase/decrease of the difference in temperature there between.

2. The power system according to claim 1, wherein said target power value determining unit determines, for a power storage unit of a high temperature of which a temperature difference from another power storage unit is not lower than a prescribed threshold, that said corresponding target power value is to be substantially zero.

3. The power system according to claim 1, further comprising a state value obtaining unit for obtaining a state value representing a state of charge of each of said plurality of power storage units; wherein the target power value determining unit determines said target power value for each of said plurality of power storage units in accordance with the state values of said plurality of power storage units obtained by said state value obtaining unit, in addition to the temperatures of said plurality of power storage units.

4. The power system according to claim 3, wherein each of said plurality of power storage units is implemented by a lithium ion battery.

5. The power system according to claim 1, wherein said target power value determining unit determines, for a power storage unit having a relatively high state of charge as compared with another power storage unit, said target power value such that the ratio of distribution of said required power value becomes larger when power is supplied from said power system to said load device, and the ratio of distribution of said required power value becomes smaller when power is supplied from said load device to said power system.

6. The power system according to claim 5, wherein each of said plurality of power storage units is implemented by a lithium ion battery.

7. The power system according to claim 1, wherein said plurality of power storage units are arranged in one same housing.

8. A power system having a plurality of power storage units each being rechargeable, comprising:

a power line electrically connecting a load device and said power system;

a plurality of converter units provided between said plurality of power storage units and said power line, respectively, each being capable of controlling charging/discharging of a corresponding power storage unit;

a battery temperature detecting unit for obtaining a temperature of each of said plurality of power storage units; and a control unit for controlling said plurality of converter units; wherein said control unit distributes a required power value from said load device in accordance with temperatures of said plurality of power storage units obtained by said battery temperature detecting unit, determines a target power value for each of said plurality of power storage units, and controls said plurality of converter units in accordance with said determined target power values; and said control unit determines said target power value such that a difference in distributed power value between a power storage unit and another power storage unit gradually increases/decreases with an increase/decrease of the difference in temperature there between.

9. A vehicle comprising:

a power system and a driving force generating unit receiving a power supply from said power system and generating driving force, wherein said power system includes:

a power line electrically connecting said driving force generating unit and said power system;

a plurality of converter units provided between a plurality of power storage units and said power line, respectively, each being capable of controlling charging/discharging of a corresponding power storage unit;

temperature obtaining unit for obtaining a temperature of each of said plurality of power storage units;

target power value determining unit for determining a target power value for each of said plurality of power storage units, by distributing a required power value from said driving force generating unit in accordance with temperatures of said plurality of power storage units obtained by said temperature obtaining unit; and converter control unit for controlling said plurality of converter units in accordance with said target power value determined by said target power value determining unit, wherein said target power value determining unit determines said target power value such that a difference in distributed power value between a power storage unit and another power storage unit gradually increases/decreases with an increase/decrease of the difference in temperature there between.

10. A method of controlling a power system having a plurality of power storage units each being rechargeable, wherein said power system includes a power line electrically connecting a load device and said power system and a plurality of converter units provided between said plurality of power storage units and said power line, respectively, each being capable of controlling charging/discharging of a corresponding power storage unit;

said control method comprising a temperature obtaining step of obtaining a temperature of each of said plurality of power storage units;

a target power value determining step of determining a target power value for each of said plurality of power storage units, by distributing a required power value from said load device in accordance with temperatures of said plurality of power storage units obtained at said temperature obtaining step; and a converter control step of controlling said plurality of converter units in accordance with said target power value determined at said determining step, wherein said target power value determining step determines said target power value such that a difference in distributed power value between a power storage unit and another power storage unit gradually increases/decreases with an increase/decrease of the difference in temperature there between.

* * * * *

UNITED STATES PATENT AND TRADEMARK OFFICE
CERTIFICATE OF CORRECTION

PATENT NO. : 8,344,699 B2  
APPLICATION NO. : 12/311823  
DATED : January 1, 2013  
INVENTOR(S) : Hichirosai Oyobe et al.

Page 1 of 1

It is certified that error appears in the above-identified patent and that said Letters Patent is hereby corrected as shown below:

On the Title page, on item (73), change

"Assignee: TOYOTA JIDOSHA KABUSHIKI KAISA, Toyota, JP" to

-- Assignee: TOYOTA JIDOSHA KABUSHIKI KAISHA, Toyota, JP --

Signed and Sealed this
Fourteenth Day of May, 2013

Teresa Stanek Rea
*Acting Director of the United States Patent and Trademark Office*